United States Patent

[11] 3,623,954

[72] Inventors Klaus Kieslich
Berlin;
Wolfgang Koch, Darmstadt-Arheilgen,
both of Germany
[21] Appl. No. 12,878
[22] Filed Jan. 28, 1970
[45] Patented Nov. 30, 1971
[73] Assignee Schering Aktiengesellschaft
Berlin, Germany
[32] Priority Jan. 27, 1969
[33] Germany
[31] P 19 04 544.4

[54] PROCESS FOR MAKING 6-HYDROXY-3-KETO-Δ1,4-STEROIDS OF THE PREGNANE AND ANDROSTANE SERIES
18 Claims, No Drawings

[52] U.S. Cl. .................................................. 195/51 R,
260/343.2, 260/397.47, 260/239.55, 260/397.45
[51] Int. Cl. .................................................... C07c 167/00
[50] Field of Search ............................................. 195/51

[56] References Cited
OTHER REFERENCES
Lee et al., Biochemistry, Vol. 3, pages 1,267– 1,271, Sept., 1964.

*Primary Examiner*—Alvin E. Tanenholtz
*Attorney*—Michael S. Striker

ABSTRACT: 6-hydroxy-3-keto-$\Delta^{1,4}$-steroids of the pregnane or androstane series are made by fermenting a 3$\beta$-hydroxy or 3$\beta$-acyloxy-5,6-epoxy steroid of the pregnane or androstane series which is saturated in the A-ring with bacteria of the genus Bacillus, Mycobacterium or Arthrobacter or enzymes thereof.

PROCESS FOR MAKING 6-HYDROXY-3-KETO-Δ1,4-STEROIDS OF THE PREGNANE AND ANDROSTANE SERIES

BACKGROUND OF THE INVENTION

Experiments have already been carried out to test the action of micro-organisms on substrates which include a 3β-hydroxy-5,6-epoxy group; see S. S. Lee and Ch. J. Shi/Biochem. 3 1267 (1964). These tests indicated that the resulting products were predominantly products having a 9,10-seco-structure.

It was therefore most surprising that 6-hydroxy-3-keto-Δ1,4-steroids could be made in industrially acceptable yields and in smoothly proceeding reactions by using specific types of micro-organisms identified below.

SUMMARY OF THE INVENTION

According to the invention, 6-hydroxy-3-keto-Δ1,4-steroids of the pregnane and androstane series are made by fermenting a 3β-hydroxy or 3β-acyloxy-5,6-epoxy steroid of the pregnane or androstane series which is saturated in the A-ring with bacteria of the genus Bacillus, Mycobacterium or Arthrobacter or enzymes thereof.

DESCRIPTION OF THE PREFERRED EMBODIMENTS

Among the above-identified genera of micro-organisms the preferred species are *Bacillus lentus, bacillus sphaericus, mycobacterium phlei, Mycobacterium smegmatis* or *Arthrobacter simplex*.

It is essential for the process of the invention that the steroid used as starting product has a 3β-hydroxy- or 3β-acyloxy-group and additionally has an α- or β-oriented 5,6-epoxy ring. In addition, it may have various substituents which are more or less a matter of choice. For instance, the steroid may have free or functionally modified hydroxyl groups, for instance in the 11α, 11β, 14α, 15α, 16,- 17-and/or 21-position. It may also have lower alkyl groups, for instance in the 7α, 16- and/or 18-position, free or functionally modified keto groups, for instance in the 11- and/or 17- or 20-position or halogen atoms, preferably chlorine or fluorine, for instance in the 16-position. The steroid may also include additional double bonds, for instance in the 7-, 9(11)-, 14(15)- and/or 16-position.

The 6-hydroxyl group which is introduced by the process of the invention may be α- or β-oriented depending on the 5-,6-epoxy ring.

The microbiological conversion of the starting products may be carried out, for instance, in the following manner. By preliminary tests there are, in the first place, ascertained the optimum fermentation conditions such as the selection of a suitable nutritive medium, a suitable substrate solvent, the preferable substrate concentration, the technical conditions such as temperature, airing, pH, stirring, and the optimum times for germination and addition of the substrate, as well as the most favorable contact time. All these elements are determined analytically, particularly by thin-layer chromatography.

Using the thus-predetermined reaction conditions, the micro-organism is then subjected to initial cultivation in the nutrient medium by submersion under aerobic conditions, is then further multiplied whereupon the substrate is added in the form of a solution or suspension. The course of the fermentation is analytically observed or traced by means of thin-layer chromatography.

Upon completion of the fermentation, the reaction product is extracted from the culture broth with a suitable organic solvent, and is isolated from the extract, for instance, by means of evaporation concentration and conventional purification methods such as recrystallization and/or chromatography.

There are thus obtained 6-hydroxy-3-keto-Δ1,4-steroids of the pregnane and androstane series. An example of the products obtained is 6α-hydroxy-1-dehydro- testololactone.

Other examples of the products of the invention have, for instance, the formula

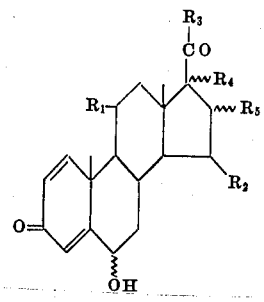

wherein R is =0 or βOH or H, $R_2$ is OH or H, $R_3$ is $CH_3$ or $CH_2OH$, $R_4$ is αOH or H, $R_5$ is α-methyl or H, and $R_4$ and $R_5$ together may also form an α-epoxy ring in conjunction with the adjoining carbon atoms.

Specific examples of compounds coming under this formula, are, e.g., the following:

6α,15β-dihydro-16α-methyl-1,4-pregnadiene-3,11,2o-trione;
6α,21-dihydroxy-16α-methyl-1,4-pregnadiene-3,2o-dione;
6α,21-dihydroxy-1,4-pregnadiene-3,2o-dione;
6α-hydroxy-16α-methyl-1,4-pregnadiene3,2o-dione;
6α,17α-dihydroxy-1,4-pregnadiene-3,2o-dione;
6α,11β,21-trihydroxy-1,4-pregnadiene-3,2o-dione;
6α,11β,21-trihydroxy-16α-methyl-1,4-pregnadiene-3,2o-dione;
6α-hydroxy-16α,17α-epoxy-1,4-pregnadiene-3,2o-dione;
6α,21-dihydroxy-16α17α-epoxy—1,4-pregnadiene-3,2o-dione.

The process of the invention constitutes a technically facile method for making 6-hydroxy-3-keto-Δ1,4-steriods of the pregnane and androstane series. These compounds are valuable intermediates for making products having hormonal activity.

For instance, the 6α,11β,21-trihydroxy-16α-methyl-1,4-pregnadiene-3,2o-dione can be converted into the 11β,21-dihydroxy-16α-methyl-1,4,6-pregnatriene-3,2o-dione, which in turn can be reacted with hydrogen fluoride and N-bromosuccinimide to form the 6α-fluoro-7α-bromo-11β,21-dihydroxy-16α-methyl-1,4-pregnadiene-3,2o-dione. The latter compound may then be subjected debromination by hydrogenation and subsequent acid catalyst isomerization of the 6β-fluorine substituent. Thus it is possible without any difficulty to form the 6α-fluoro-11β,21-dihydroxy-16α-methyl-1,4-pregnadiene-3,2o-dione ("Fluorcortolon").

It is also well known that some of the 6-hydroxy-steroids themselves have valuable pharmaceutical properties. An example is the 6β-hydroxy-prednisone (U.S. Pat. No. 3,058,889), which has an antiinflammatory action.

Making of the Starting Product

As has been indicated, the starting product is a 3β-hydroxy- or 3β-acetoxy-epoxy-steroid. These steroids in turn are made from the corresponding 3β-hydroxy or 3β-acyloxy-Δ5-steroids which are subjected to an epoxidation of the Δ5-double bond, for instance by means of peracids.

The following will illustrate the making of the starting product by means of a specific example. Sixty g. of 3β-hydroxy-21-acetoxy-16α-methyl-5- -pregnaene-20-one were dissolved in 1.8 l. of dry methylene chloride and reacted with 12 g. sodium acetate (in melted condition), and 40 g. of sodium sulfate (dessicated). At 2° C., 36 ml. peroxyacetic acid were then added dropwise while stirring during a time of 30 minutes. Thereafter, 12 g. of sodium acetate and 14 g. of sodium sulfate were again added and 36 ml. of peroxyacetic acid were again added dropwise during the same period of time as previously. The mass was then subjected to further stirring causing the solution to warm up to room temperature during the course of 2 hours.

After neutralization with 1 liter of a 5% $NaHCO_3$ solution, while stirring, separation of the methylene chloride was then effected and the solution was washed with water, $FeSO_4$ solution, and then again water, and then was dried over $Na_2SO_4$ and concentrated in vacuo at 40° C. The residue was subjected to recrystallization from acetic acid ester. There was thus obtained 3β-hydroxy-21acetoxy-5α,6α-epoxy-16α-methyl-pregnane-20-one, melting point 167°–169° C. Yield: about 85 percent.

If 3-acetates were desired, they could be obtained by epoxidation of the analogous $\Delta^5$-3-acetates or also by subsequent acetylation of the 3β-hydroxy-5α,6α-epoxy compounds.

The following examples will further illustrate the invention.

EXAMPLE 1

A conical flask was filled with 500 ml. of sterilized aqueous medium. The medium contained 0.1 percent yeast extract, 0.5 percent corn steep liquor and 0.05 percent starch sugar.

The mass was adjusted to a pH of 7.0. It was then inoculated with a lyophilized culture of *Arthrobacter simplex* and was subjected to shaking for 48 hours at 30° C. and 145 r.p.m. A 20 l. fermenter was then charged with 14.75 l. of a sterilized nutrient medium of the same composition and was inoculated with 250 ml. of the above-described bacterial suspension. The mass was subjected to shaking for 24 hours at 29° C. while airing with 1650 l. per hour at 220 r.p.m.

0.9 liter of this preliminary fermentation were transferred to a 20-liter fermenter, which was charged with 14.1 liter of a sterilized medium of the same composition. The principal fermentation mass was then subjected to the same procedure as employed in the preliminary fermentation. The pH value during the principal fermentation was maintained between 6 and 7. After an initial phase of 6 hours, 3.75 g. of 3β-hydroxy-5 α,6α-epoxy-testololactone in 80 ml. dimethylformamide were added and subjected to fermentation. The course of the reaction was traced by thin-layer chromatography of methylisobutylketone extracts of individual specimens. The complete conversion of the starting material was effected after about 34 hours.

The culture was then stirred with methylisobutylketone and the extract was concentrated at a maximum bath temperature of 40° C. in a vacuum until dry. The residue was washed with a small amount of cold hexane and there were thus obtained, after drying, 3.2 g. of 6α-hydroxy-1-dehydrotestololactone, which after recrystallization from methanol had a melting point between 297° and 299° C. $\epsilon_{241}$=15,820.

EXAMPLE 2

The same process was used as in example 1, but a lyophilized culture was employed of *Bacillus lentus* instead of *Arthrobacter simplex*. Furthermore, the initial culture medium was an aqueous medium which had been adjusted to a pH of 7 and contained 1.5 percent of peptone, 1.2 percent of cornsteep liquor, 0.2 percent $MgSO_4$ (instead of the yeast extract-cornsteep-glucose medium). The medium for the preliminary and main fermentation otherwise was the same as in example 1.

The reaction was complete after a contact time of 28 hours. There were was thus obtained 3.1 g. of crude product which, after recrystallization from methanol, furnished 2.2 g. 6α-hydroxy-1-dehydrotestololactone; m.p. 293°–295° C.

The compound was the same as the product obtained in example 1, as ascertained by a comparison of the spectra and the mixture melting points.

EXAMPLE 3

In the same manner as in example 2, there were dissolved 3.75 g. of 3β-hydroxy-5α,6α6α-epoxy-androstane-17-one in 80 ml. dimethylformamide which were then fermented with *Bacillus lentus*. The reaction was complete after 28 hours. The crude product obtained (3.4 g.) was recrystallized from methanol. There were thus obtained 2.4 g. of 6α-hydroxy-1,4-androstadiene-3,17-dione; m.p. 255°–258° C. $\epsilon_{242}$=15,100.

EXAMPLE 4

The same conditions were used as in example 2. 2.7 g. of 3β,15β-dihydroxy-5α,6α-epoxy-16-methyl-pregnane-11,20-dione dissolved in 30 ml. dimethylformamide were fermented with *Bacillus lentus*. After a contact time of 27 hours, the reaction was complete. By further processing, as in the previous examples, there were obtained 2.2 g. of 6α,15β-dihydroxy-16α-methyl-1,4-pregnadiene-3,11,20-trione which, after recrystallization from acetic acid ester, has a melting point of 263°–267° C. $\epsilon_{239}$=14,100.

A specimen of this product was then subjected to acetylation in pyridine/acetic acid anhydride at room temperature. There was thus obtained the corresponding 6α,15β-diacetate. The melting point of this product was 202° to 204° C; $\epsilon_{235}$=14,800.

EXAMPLE—5

Following again the procedure of example 2, 3.75 of 3β-hydroxy-21-acetoxy-5α,6α-epoxy-16α-methyl-pregnane-20-one were fermented for 27 hours with *Bacillus lentus* and then subjected to further processing. By column chromatography and recrystallization from acetone/isopropylether, there was obtained 6α,21-dihydroxy-16α-methyl-1,4-pregnadiene-3,20-dione; m.p. 207°–209° C.; $\epsilon_{241}$=15,400.

EXAMPLE 6

Following the procedure of example 2, 3.0 g. of 3β-hydroxy-21-acetoxy-5α,6α-epoxy-pregnane-20-one were fermented for 30 hours in 12 liters of *Bacillus lentus* culture, and then subjected to further processing. By column chromatography, and recrystallization from acetone/isopropyl-ether, there were obtained 6α,21,-dihydroxy-1,4-pregnadiene-3,20-dione; m.p. —187°–A189° C.; $\epsilon_{243}$=15,700.

EXAMPLE 7

Following the procedure of example 2, 3.75 g. of 3β-hydroxy-5α,6α-epoxy-16-methyl-pregnane-20-one were fermented for 28 hours with *Bacillus lentus* and then subjected to further processing after column chromatography and recrystallization from acetone/hexane, there was obtained 6α-hydroxy-16α-methyl-1,4-pregnadiene-3,20-dione; m.p. 178°–180° C.; $\epsilon_{241}$=14,100.

EXAMPLE 8

Following the procedure of example 2,2-liter shaking vessels were charged, each, with 500 ml. medium for fermentation purposes. In each vessel there were then fermented 125 mg. 3β,17α-dihydroxy-5α,6α-epoxy-pregnane-20-one with *Bacillus lentus*. The reaction was complete after 30 hours. There followed the usual further treatment and recrystallization from acetone-hexane which furnished 6α,17α-dihydroxy-1,4-pregnadiene-3,20-dione; $\epsilon_{241}$=14,000.

EXAMPLE 9

Following the procedure of example 1, 1.87 g. of 3β,11β-21-trihydroxy-5α,6α-epoxy-pregnane-20-one were fermented in 15 liters of culture broth of *Arthrobacter simplex* and subjected to fermentation for 20 hours and then subjected to further processing. By column chromatography of the crude product and recrystallization from acetic acid ester/isopropylether, there were obtained 6α,11β,21-trihydroxy-1,4-pregnadiene-3,20-dione. m.p. 210°/211°—212° C.; $\epsilon_{240}$=14,200.

EXAMPLE 10

Following the procedure of example 1, 1.87 g. of 3β,11β,21-trihydroxy-5α,6α-epoxy-16α-methyl-pregnane-20-one were fermented in 15 liters of a culture broth of *Arthrobacter simplex* for 27 hours and then subjected to further processing. By column chromatography, the crude product was subjected to separation and purification. After recrystallization from acetone/isopropylether, there were obtained 6α,11β,21-trihydroxy-16α-methyl-1,4-pregnadiene-3,20-dione; m.p. 211°-212° C.; $\epsilon_{242}$=14,600.

EXAMPLE 11

Following the procedure of example 1, 2 g. of 3β-hydroxy-5β,6β-epoxy-testololactone were dissolved in 50 ml. dimethylformamide, were fermented in 8 l. of a culture broth for a period of 56 hours with *Arthrobacter simplex*. By further treatment as above described, an oily crude product (1.5 g.) was obtained and separated by column chromatography on silica gel. After recrystallization from acetic acid ester/isopropyl ether, there was obtained 6β-hydroxy-1-dehydro-testololactone; m.p. 254°-258° C.; $\epsilon_{243}$=16,000.

EXAMPLE 12

Following the procedure of example 2, 3.75 g. of 3β-hydroxy-5α,6α,16α,17α-diepoxy-pregnane-20-one were fermented in 15 liter of a culture broth of *Bacillus lentus*. After 29 hours, the reaction was complete. The crude product (2.93 g.) which was obtained by the treatment as described was then recrystallized from acetic acid ester and furnished 6α-hydroxy-16α,17α-epoxy-1,4-pregnadiene-3,20-dione; m.p. 227°-230° C.; $\epsilon_{242}$=14,500.

EXAMPLE 13

Following the procedure of example 2, 3.75 g. of 3β-hydroxy-21acetoxy-5α,6α,16α,17α-diepoxy-pregnane-20-one were fermented with *Bacillus lentus*. After 26 hours, the reaction was complete. The crude product (3.3 g.) which was obtained by the treatment as described was recrystallized from acetic acid ester-isopropylether and furnished 6α,21-dihydroxy-16α-17α-epoxy-1,4-pregnadiene-3,20-dione; m.p. 55°-60 C.; $\epsilon_{241}$=13,900.

EXAMPLE 14

A lyophilized culture of *Bacillus sphaericus* ATCC 7055 was introduced into a solution of 500 ml. of a sterile, aqueous medium which contained 0.1% peptone, 0.2% cornsteep liquor, 0.5% glucose, and 0.5% yeast extract, and which was adjusted to a pH of 7. The mass was subjected to shaking for 48 hours at 30° C. 15 ml. of the bacterial suspension were then transferred to a 2-liter chemical flask which was filled with 500 ml. of the same medium. After 24 hours, 50 ml. of the culture broth, each, were transferred into four conical flasks which had been filled, each, with 500 ml. of the same medium. After shaking for 6 hours, there were added to each flask 100 mg. of 3β -hydroxy-5α,6α-epoxy-androstane-17-one dissolved in 5 ml. dimethylformamide. The mass was then shaken for another 42 hours at 30° C. Thereafter, the fermentation broth was shaken with methyl isobutylketone. An adequate amount of the extract was then tested against a comparison amount of a standard which was 6α-hydroxy-1,4-androstadiene-3,17-dione. This test was carried out on silica gel plates by thin-layer chromatography; Rf 0.37 (benzene/acetic acid ester 1:4) The extract which contained about 70 -80 percent of the converted product was then further processed in the described manner by column chromatography and the separated crude product was recrystallized from acetone/isopropylether. There were thus obtained 275 mg. of 6α-hydroxy-1,4-androstadiene-3,17-dione; m.p. 257°-259° C.

EXAMPLE 15

A lyophilized culture of *Mycobacterium phlei* was subjected to initial cultivation and fermentation. The substrate was again 400 mg. of 3β-hydroxy-5α,6α-epoxy-androstane-17-one.

The fermentation time was 42 hours. After thin-layer chromatography, there were again obtained 17 –80 percent of 6α-hydroxy-1,4-androstandiene-3,17-dione (Rf 0.37 benzene/acetic acid ester 1:4). After further processing of the mass as above there were obtained 260 mg. of 6α-hydroxy-1,4-androstadiene-3,17-dione; m.p. 255°-259° C.

EXAMPLE 16

A lyophilized culture of *Mycobacterium smegmatis* ATCC 14468 was subjected to initial cultivation as in example 14. The substrate was again 400 mg. of 3βhydroxy-5α,6α-epoxy-androstane-17-one. The fermentation time was 64 hours. After thin-layer chromatography, there were obtained about 50 percent of 6α-hydroxy-1,4-androstadiene-3,17-dione. After further treatment as described above, there were obtained 180 mg. of 6α-hydroxy-1,4-androstadiene-3,17-dione; m.p. 254°-257° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. The process of making 6-hydroxy-3-keto-$\Delta^{1,4}$-steroids of the pregnane or androstane series comprising fermenting a 3β-hydroxy- or 3β-acyloxy-5,6-epoxy steroid of the pregnane or androstane series which is saturated in the A-ring with bacteria of the genus *Bacillus*, *Mycobacterium* or *Arthrobacter* or enzymes thereof.

2. The process of claim 1, wherein the bacteria belong to the species *Bacillus lentus*, *Bacillus sphaericus*, *Mycobacterium phlei*, *Mycobacterium smegmatis* or *Arthrobacterium simplex*.

3. The process of claim 1 wherein said steroid subjected to fermentation is 3β-hydroxy-5α,6α-epoxy-testololactone, said bacteria is *Arthrobacter simplex* and there is recovered 6α-hydroxy-1-dehydro-testololactone.

4. The process of claim 1 wherein said steroid subjected to fermentation is 3β-hydroxy-5α,6α-epoxy-testololactone, said bacteria is *Bacillus lentus* and there is recovered 6α-hydroxy-1-dehydro-testololactone.

5. The process of claim 1 wherein said steroid subjected to fermentation is 3β-hydroxy-5α,6α-epoxy-androstane-17-one, said bacillus is *Bacillus lentus* and there is recovered 6α-hydroxy-1,4-androstadiene-3,17 -dione.

6. The process of claim 1 wherein said steroid is 3β,15β-dihydroxy-5α,6α-epoxy-16α-methyl-pregnane-11,20-dione, said bacillus is *Bacillus lentus and there is recovered* 6α,15β-dihydroxy-16α-methyl-1,4-pregnadiene-3,11,20-trione.

7. The process of claim 1 wherein said steroid subjected to fermentation is 3α-hydroxy-21-acetoxy-5α,6α-epoxy-16α-methyl-pregnane-20-one, said bacillus is *Bacillus lentus* and there is recovered 6α,21-dihydroxy-16α-methyl-1,4-pregnadiene-3,20-dione.

8. The process of claim 1 wherein said steroid subjected to fermentation is 3β-hydroxy-21-acetoxy-5α,6α-epoxy-pregnane-20-one, said bacillus is *Bacillus lentus* and there is recovered 6α,21-dihydroxy-1,4-pregnadiene-3,20-dione.

9. The process of claim 1 wherein said steroid subjected to fermentation is 3β-hydroxy-5α,6α-epoxy-16-methyl-pregnane-20-one, said bacillus is *Bacillus lentus* and there is recovered 6α-hydroxy-16α-methyl-1,4-pregnadiene-3,20-dione.

10. The process of claim 1 wherein said steroid subjected to fermentation is 3β,17α-dihydroxy-5α,6α-epoxy-pregnane-20-one, said bacillus is *Bacillus lentus* and there is recovered 6α,17α-dihydoxy-1,4-pregnadiene 3,20-dione.

11. The process of claim 1 wherein said steroid subjected to fermentation is 3β,11β,21-trihydroxy-5α,-6α-epoxy-pregnane, said bacteria is *Arthrobacter simplex* and there is recovered 6α,11β,21-trihydroxy-1,4pregnadiene-3,20-dione.

12. The process of claim 1 wherein said steroid subjected to fermentation is 3β,11β,21-trihydoroxy-5α6α-epoxy-16α-methyl-pregnane, said bacteria is *Arthrobacter simplex* and there is recovered 6α,11β,21-trihydroxy-16α-methyl-1,4-pregnadiene-3,20-dione.

13. The process of claim 1 wherein said steroid subjected to fermentation is 3β-hydroxy-5β,6β-epoxy-testololactone, said bacteria is *Arthrobacter simplex* and there is recovered 6β-hydroxy-1-dehydro-testololactone.

14. The process of claim 1 wherein said steroid subjected to fermentation is 3β-hydroxy-5α,6α,16α,17α-diepoxy-pregnane-20-one, said bacteria is *Bacillus lentus* and there is recovered 6α-hydroxy-16α,17α-epoxy-1,4-pregnadiene-3,20-dione.

15. The process of claim 1 wherein said steroid subjected to fermentation is 3β-hydroxy-21-acetoxy-5α,6α-16α,17α-diepoxy-pregnane-20-one, said bacteria is *Bacillus lentus* and there is recovered 6α,21-dihydroxy-,16α,17α-epoxy-1,4-pregnadiene-3,20-dione.

16. The process of claim 1 wherein said steroid subjected to fermentation is 3β-hydroxy-5α,6α-epoxy-androstane-17-one, said bacteria is *Bacillus sphaericus* and there is recovered 6α-hydroxy-1,4-androstiene-3,17-dione.

17. The process of claim 1 wherein said steroid subjected to fermentation is 3β-hydroxy-5α,6α-epoxy-androstane-17-one, said bacteria is *Mycobacterium phlei* and there is recovered 6α-hydroxy-1,4-androstadiene-3,7-dione.

18. The process of claim 1 wherein said steroid subjected to fermentation is 3β-hydroxy-5α,6α-epoxy said bacteria is *Mycobacterium smegmatic* and there is recovered 6α-hydroxy-1,4-androstadiene-3,17-dione.

* * * * *